(12) United States Patent
Osako et al.

(10) Patent No.: US 10,118,252 B2
(45) Date of Patent: Nov. 6, 2018

(54) METHODS AND SYSTEMS FOR LASER PROCESSING CONTINUOUSLY MOVING SHEET MATERIAL

(71) Applicant: Electro Scientific Industries, Inc., Portland, OR (US)

(72) Inventors: Yasu Osako, Lake Oswego, OR (US); Mark Unrath, Portland, OR (US); Mark Kosmowski, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 14/707,950

(22) Filed: May 8, 2015

(65) Prior Publication Data
US 2015/0239064 A1    Aug. 27, 2015

Related U.S. Application Data

(63) Continuation of application No. 11/949,582, filed on Dec. 3, 2007, now Pat. No. 9,029,731.

(60) Provisional application No. 60/886,881, filed on Jan. 26, 2007.

(51) Int. Cl.
*B23K 26/08*    (2014.01)
*B23K 26/38*    (2014.01)

(52) U.S. Cl.
CPC .......... *B23K 26/0846* (2013.01); *B23K 26/38* (2013.01)

(58) Field of Classification Search
CPC ............ B23K 26/0344; B23K 26/0838; B23K 26/0846
See application file for complete search history.

(56) References Cited

U.S. PATENT DOCUMENTS

| | | | |
|---|---|---|---|
| 2,753,181 A | 7/1956 | Anander | |
| 3,007,368 A | 11/1961 | Rosenblum | |
| 3,019,130 A | 1/1962 | Hornbostel | |
| 3,057,529 A | 10/1962 | Fitch | |

(Continued)

FOREIGN PATENT DOCUMENTS

| | | |
|---|---|---|
| CN | 1190047 A | 8/1998 |
| EP | 0671239 A1 | 6/1994 |

(Continued)

OTHER PUBLICATIONS

U.S. Appl. No. 11/949,534, United States Office Action, dated Jan. 22, 2010, 13 pages.

(Continued)

*Primary Examiner* — Tu B Hoang
*Assistant Examiner* — Erin McGrath

(57) ABSTRACT

Systems and methods for laser processing continuously moving sheet material include one or more laser processing heads configured to illuminate the moving sheet material with one or more laser beams. The sheet material may include, for example, an optical film continuously moving from a first roller to a second roller during a laser process. In one embodiment, a vacuum chuck is configured to removably affix a first portion of the moving sheet material thereto. The vacuum chuck controls a velocity of the moving sheet material as the first portion is processed by the one or more laser beams. In one embodiment, a conveyor includes a plurality of vacuum chucks configured to successively affix to different portions of the sheet material during laser processing.

14 Claims, 7 Drawing Sheets

(56) References Cited

U.S. PATENT DOCUMENTS

| | | | |
|---|---|---|---|
| 3,140,030 A | 7/1964 | Stewart | |
| 3,180,608 A | 4/1965 | Fischer | |
| 3,231,668 A | 1/1966 | Nishiwaki et al. | |
| 3,321,121 A | 5/1967 | Nyberg et al. | |
| 3,392,930 A | 7/1968 | Goldfarb | |
| 3,395,401 A | 7/1968 | Silverman | |
| 3,396,887 A | 8/1968 | Bade | |
| 3,408,144 A | 10/1968 | Cowan, Jr. | |
| 3,477,322 A | 11/1969 | Gerber et al. | |
| 3,626,141 A | 12/1971 | Daly | |
| 3,682,750 A | 8/1972 | Gerber | |
| 3,745,846 A | 7/1973 | Birckhead et al. | |
| 3,761,675 A | 9/1973 | Mason et al. | |
| 3,765,289 A | 10/1973 | Gerber et al. | |
| 3,848,327 A | 11/1974 | Gerber et al. | |
| 4,345,496 A | 8/1982 | Pearl | |
| 4,452,113 A | 6/1984 | Pearl | |
| 4,475,969 A | 10/1984 | Reed | |
| 4,476,756 A | 10/1984 | Pearl et al. | |
| 4,542,672 A | 9/1985 | Pearl | |
| 4,542,673 A | 9/1985 | Pearl | |
| 4,639,572 A | 1/1987 | Gruzman et al. | |
| 4,672,172 A | 6/1987 | Pearl | |
| 4,680,442 A | 7/1987 | Bauer et al. | |
| 4,740,668 A | 4/1988 | Perez | |
| 4,782,208 A | 11/1988 | Withrow et al. | |
| 4,896,326 A | 1/1990 | Kafka et al. | |
| 4,941,021 A | 7/1990 | Uchida et al. | |
| 5,191,466 A | 3/1993 | Gross et al. | |
| 5,250,784 A | 10/1993 | Muller et al. | |
| 5,421,933 A | 6/1995 | Nedblake et al. | |
| 5,444,212 A | 8/1995 | MacNaughton et al. | |
| 5,466,325 A * | 11/1995 | Mizuno | B29C 63/0013 156/234 |
| 5,487,807 A | 1/1996 | Nedblake et al. | |
| 5,561,918 A | 10/1996 | Marschke | |
| 5,611,949 A | 3/1997 | Snellman et al. | |
| 5,624,520 A | 4/1997 | Nedblake et al. | |
| 5,679,199 A | 10/1997 | Nedblake et al. | |
| 5,681,412 A | 10/1997 | Nedblake et al. | |
| 5,746,010 A | 5/1998 | Marschke et al. | |
| 5,751,585 A | 5/1998 | Cutler et al. | |
| 5,798,927 A | 8/1998 | Cutler et al. | |
| 5,820,006 A | 10/1998 | Turner | |
| 5,857,605 A | 1/1999 | Welch et al. | |
| 5,878,464 A | 3/1999 | White | |
| 5,909,278 A | 6/1999 | Deka et al. | |
| 5,940,789 A | 8/1999 | Yuan | |
| 5,960,933 A | 10/1999 | Albrecht | |
| 5,961,860 A | 10/1999 | Lu et al. | |
| 5,981,903 A | 11/1999 | Baumgart et al. | |
| 5,994,665 A | 11/1999 | Nishibayashi et al. | |
| 6,040,552 A | 3/2000 | Jain et al. | |
| 6,040,553 A | 3/2000 | Ross | |
| 6,090,330 A | 7/2000 | Gawa et al. | |
| 6,144,007 A | 11/2000 | Levin | |
| 6,172,330 B1 | 1/2001 | Yamamoto et al. | |
| 6,181,463 B1 | 1/2001 | Galvanauskas et al. | |
| 6,291,796 B1 | 9/2001 | Lu et al. | |
| 6,339,604 B1 | 1/2002 | Smart | |
| 6,499,280 B1 | 12/2002 | Tsutsui | |
| 6,519,137 B1 | 2/2003 | Nitta et al. | |
| 6,521,866 B1 | 2/2003 | Arai et al. | |
| 6,592,693 B1 | 7/2003 | Nedblake | |
| 6,630,057 B2 | 10/2003 | Broom et al. | |
| 6,697,408 B2 | 2/2004 | Kennedy et al. | |
| 6,706,999 B1 | 3/2004 | Barrett et al. | |
| 7,027,199 B2 | 4/2006 | Johnson et al. | |
| 7,052,976 B2 | 5/2006 | Liu | |
| 7,098,423 B2 | 8/2006 | Masuda et al. | |
| 7,205,501 B2 | 4/2007 | Arai et al. | |
| 7,245,412 B2 | 7/2007 | Bruland et al. | |
| 7,625,465 B2 | 12/2009 | Pesch et al. | |
| 7,633,035 B2 | 12/2009 | Kirmeier | |
| 7,638,731 B2 | 12/2009 | Kosmowski | |
| 7,723,642 B2 | 5/2010 | Gu et al. | |
| 7,732,732 B2 | 6/2010 | Hiramatsu | |
| 7,817,685 B2 | 10/2010 | Osako | |
| 7,955,905 B2 | 6/2011 | Cordingley et al. | |
| 7,955,906 B2 | 6/2011 | Cordingley et al. | |
| 8,081,668 B2 | 12/2011 | Grant et al. | |
| 8,084,706 B2 | 12/2011 | Johnson et al. | |
| 8,110,777 B2 | 2/2012 | Zuehlke et al. | |
| 8,148,211 B2 | 4/2012 | Bruland et al. | |
| 8,173,931 B2 | 5/2012 | Wen et al. | |
| 8,198,566 B2 | 6/2012 | Baird et al. | |
| 8,208,506 B2 | 6/2012 | Osako et al. | |
| 8,257,638 B2 | 9/2012 | Nakai et al. | |
| 8,445,812 B2 | 5/2013 | Lupinetti et al. | |
| 8,524,536 B2 | 9/2013 | Nakai et al. | |
| 8,563,895 B2 | 10/2013 | Cobben | |
| 9,029,731 B2 | 5/2015 | Osako et al. | |
| 2001/0002283 A1 * | 5/2001 | Sun | A61K 9/2072 427/469 |
| 2001/0050154 A1 | 12/2001 | Broom et al. | |
| 2002/0170889 A1 | 11/2002 | Faitel | |
| 2003/0080234 A1 | 5/2003 | Baggot et al. | |
| 2003/0178398 A1 | 9/2003 | Nagatoshi et al. | |
| 2003/0217806 A1 | 11/2003 | Tait et al. | |
| 2003/0222057 A1 | 12/2003 | Gerety | |
| 2004/0026384 A1 | 2/2004 | Mueller et al. | |
| 2004/0093836 A1 * | 5/2004 | Ouellette | B65B 9/02 53/553 |
| 2004/0217093 A1 | 11/2004 | Arai et al. | |
| 2005/0045606 A1 | 3/2005 | Ito et al. | |
| 2005/0263506 A1 | 12/2005 | Masuda et al. | |
| 2005/0270631 A1 | 12/2005 | Johnson | |
| 2005/0271095 A1 | 12/2005 | Smart | |
| 2006/0027540 A1 | 2/2006 | Bruland et al. | |
| 2006/0045150 A1 | 3/2006 | Newman et al. | |
| 2006/0076323 A1 | 4/2006 | Arai et al. | |
| 2006/0132801 A1 | 6/2006 | Yonescu | |
| 2007/0023413 A1 | 2/2007 | Wilson | |
| 2007/0228016 A1 | 10/2007 | Kita et al. | |
| 2008/0083706 A1 | 4/2008 | Kirmeier | |

FOREIGN PATENT DOCUMENTS

| | | |
|---|---|---|
| JP | 04286515 A | 10/1992 |
| JP | 04303317 A | 10/1992 |
| JP | 05305544 A | 11/1993 |
| JP | 06210468 A | 8/1994 |
| JP | 08324786 A | 10/1996 |
| JP | 2000263271 | 9/2000 |
| JP | 2001031227 A | 2/2001 |
| JP | 2001242410 A | 9/2001 |
| JP | 2001315933 A | 11/2001 |
| JP | 2002045775 A | 2/2002 |
| JP | 2004195469 A | 7/2004 |
| JP | 2004216436 A | 8/2004 |
| JP | 2004298914 A | 10/2004 |
| JP | 2005034859 A | 2/2005 |
| JP | 2005053615 A | 3/2005 |
| JP | 2006101764 A | 4/2006 |
| JP | 08184833 A | 12/2006 |
| JP | 2006351977 A | 12/2006 |
| JP | 2008521615 A | 6/2008 |
| KR | 1020010058629 A | 7/2001 |
| KR | 1020040100042 A | 12/2004 |
| KR | 1020060091849 A | 8/2006 |
| WO | 9207238 | 4/1992 |
| WO | 2006062766 | 6/2006 |

OTHER PUBLICATIONS

U.S. Appl. No. 11/949,534, United States Office Action, dated Jul. 22, 2009, 17 pages.

U.S. Appl. No. 11/949,534, United States Notice of Allowability, dated Jun. 11, 2010, 14 pages.

U.S. Appl. No. 12/907,768, United States Office Action, dated Jan. 3, 2012, 28 pages.

(56) References Cited

OTHER PUBLICATIONS

Nowak, et al., "Cold processing of green state LTCC with a CO2 laser", Applied Physics A—Material Science and Processing, vol. 84, Issue 3, May 2006, pp. 267-270.
PCT/US2007/086790, International Search Report and Written Opinion, dated May 20, 2008, 9 pages.
PCT/US2007/086898, International Search Report and Written Opinion, dated May 26, 2008, 10 pages.
Taylor, "Space and Enhanced Radiation Induced Effects in Key Photonic Technologies", Aerospace Conference, 1999. Proceedings. 1999 IEEE, vol. 3, Mar. 1999, pp. 307-316.

\* cited by examiner

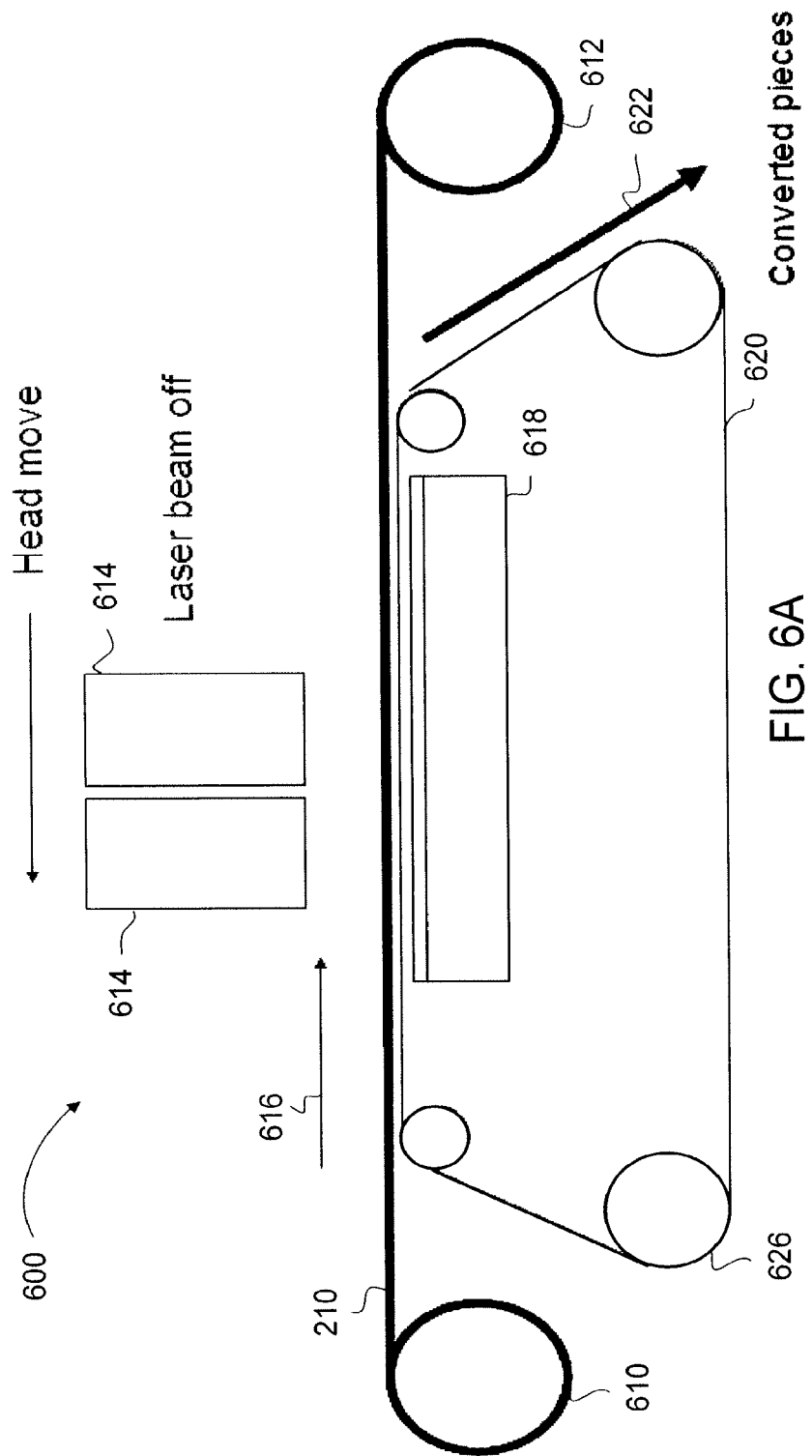

METHODS AND SYSTEMS FOR LASER PROCESSING CONTINUOUSLY MOVING SHEET MATERIAL

RELATED APPLICATION

This application is a continuation of U.S. application Ser. No. 11/949,582 filed Dec. 3, 2007, which claims the benefit under 35 U.S.C. § 119(e) of U.S. Provisional Application No. 60/886,881, filed Jan. 26, 2007, each of which is hereby incorporated by reference herein in its entirety.

TECHNICAL FIELD

This disclosure relates generally to laser processing. In particular, this disclosure relates to laser processing systems and method for processing continuously moving or unrolling sheet material.

BACKGROUND INFORMATION

Laser processing may be conducted on numerous different types of workpieces using various lasers to effect a variety of processes. Lasers may be used to form, for example, a hole and/or blind via in a single layer or multilayer workpiece. Semiconductor wafer processing may include various types of laser micromachining including, for example, scribing, dicing, drilling, removal of semiconductor links (fuses), thermal annealing, and/or trimming passive thick or thin film components.

Lasers may be used to process sheets of material, such as plastics or optical films. Large plastic or optical sheets may be cut into smaller pieces for use in flat panel displays, such as those used in, for example, cellular phones, automobile navigation systems, personal digital assistants (PDAs), laptop computers, televisions, and other electronic devices. Typically, a mechanical punching machine is used to cut the sheets of plastic or film material. The punching machines are fast, but many downtimes associated with the frequent replacement and maintenance of molds reduce the effective throughput. Further, the use of lasers to cut large sheets of material has been limited to straight cuts at high velocities.

SUMMARY OF THE DISCLOSURE

The embodiments disclosed herein provide systems and methods for laser processing a moving sheet material. In one embodiment, a system for processing a moving sheet material includes one or more laser processing heads configured to illuminate the moving sheet material with one or more laser beams, and a vacuum chuck configured to removably affix a first portion of the moving sheet material thereto. The vacuum chuck is further configured to control a velocity of the moving sheet material as the first portion is processed by the one or more laser beams.

In another embodiment, a method for processing sheet material with a laser beam includes moving the sheet material from a first roller to a second roller, and removably affixing a chuck to a first portion of the sheet material as it moves from the first roller to the second roller. The method further includes moving the chuck at a predetermined velocity, and illuminating the first portion of the sheet material with the laser beam while it is affixed to the moving chuck.

In another embodiment, a laser processing system includes means for illuminating a sheet material with a laser beam, means for holding portions of the sheet material as the portions are illuminated with the laser beam, means for moving the means for holding at a constant velocity as a first portion of the sheet material and as a second portion of the sheet material are illuminated with the laser beam, and means for feeding the sheet material through a laser processing area without stopping between the illumination of the first portion and the second portion.

Additional aspects and advantages will be apparent from the following detailed description of preferred embodiments, which proceeds with reference to the accompanying drawings.

BRIEF DESCRIPTION OF THE DRAWINGS

FIGS. 6A and 6B are block diagrams of a system for processing sheet material according to another embodiment.

DETAILED DESCRIPTION OF PREFERRED EMBODIMENTS

Figure 1A:
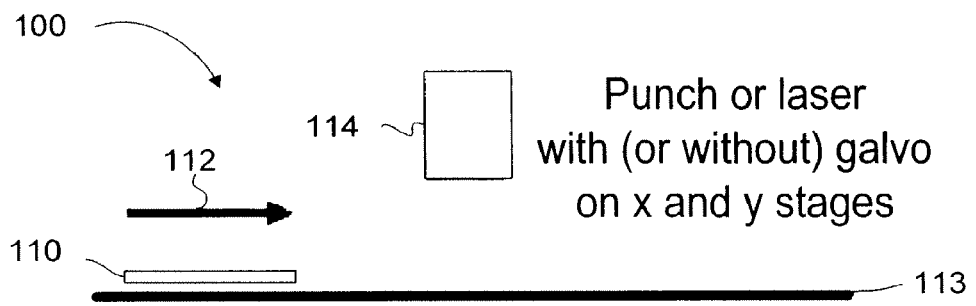
FIGS. 1A, 1B and 1C illustrate a conventional system for processing films.

Lasers may be used to process large sheets of material, such as plastics or optical films. Sheets of plastic or optical film may be used, for example, in flat panel displays for cellular phones, automobile navigation systems, personal digital assistants (PDAs), laptop computers, televisions, and other electronic devices.

Using a laser system to cut a roll of sheet material (e.g., film) into small pieces for a particular monitor size is called conversion. In the conversion process, a roll of sheet material is generally unrolled and placed over another material for processing. The converted pieces of sheet material are then collected. When the roll of sheet material is polarizing film that includes adhesive between multiple film layers, for example, the edges of the converted pieces tend to stick to the material underneath. In such a case, it is generally difficult to pick up the converted pieces without reducing productivity.

Generally, conventional conversion systems are based on a die cutting system in which patterned blades imbedded into a flat plate are used to convert the film. In such systems, a flexible rubber-like material is used in a roll-like conveyor to collect converted pieces.

A. Beam Positioning with Three Stages

Reference is now made to the figures in which like reference numerals refer to like elements. For clarity, the first digit of a reference numeral indicates the figure number in which the corresponding element is first used. In the following description, numerous specific details are provided for a thorough understanding of the embodiments of the invention. However, those skilled in the art will recognize that the invention can be practiced without one or more of the specific details, or with other methods, components, or materials. Further, in some cases, well-known structures, materials, or operations are not shown or described in detail in order to avoid obscuring aspects of the invention. Furthermore, the described features, structures, or characteristics may be combined in any suitable manner in one or more embodiments.

Figure 1B:
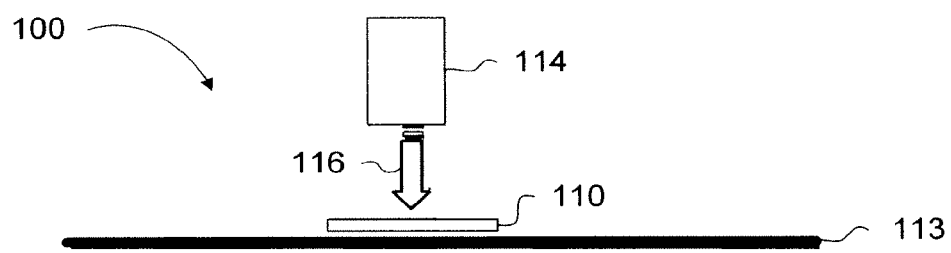
Figure 1C:
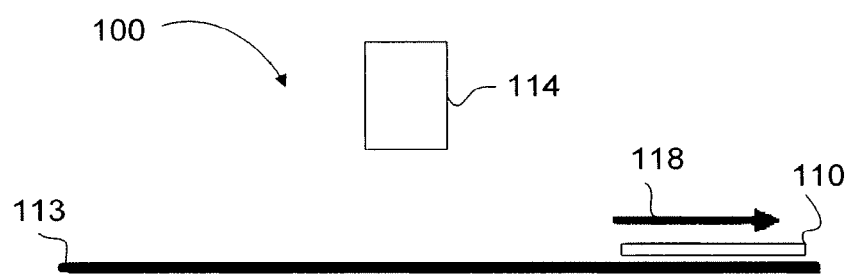
Figure 2:
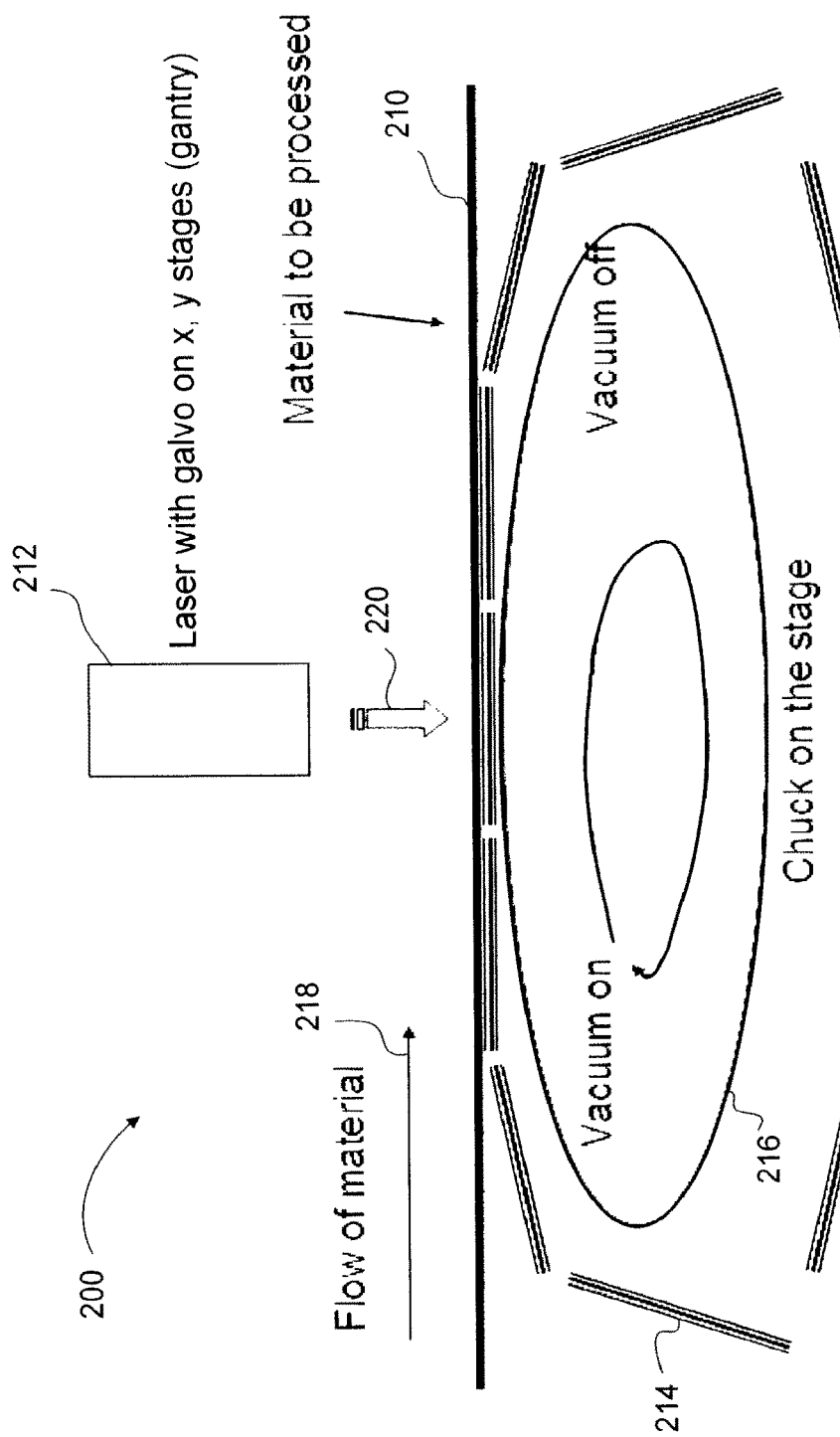
FIGS. 2, 3, 4 and 5 are block diagrams of a system for processing sheet material according to certain embodiments.

Some materials, such as rolls of film or discrete film sheets, are generally processed by being positioned and fixed in place under a mechanical punch or conventional laser processing system. For example, FIGS. 1A, 1B and 1C illustrate a conventional system 100 for processing films 110. As shown in FIG. 1A, the film 110 is first moved (as indicated by arrow 112) on a motion stage 113 into a processing area under a conversion system 114 that includes a mechanical punch or conventional laser system with (or without) a galvo on X and Y stages.

As shown in FIG. 1B, after the film 110 is positioned in the processing area, the conversion system 114 performs the processing (as indicated by arrow 116). When the conversion system 114 includes a mechanical punch or a conventional laser system, the motion stage 113 carrying the film 110 must be stopped while the processing (e.g., dicing) takes place. When positioning cutting blades or a laser beam over the film 110 with some accuracy is needed or desired, the conversion system 114 may need to perform an alignment process before the conversion system 114 processes the film 110. As shown in FIG. 1C, after processing, the motion stage 113 moves the converted film 110 out of the processing area (as indicated by arrow 118).

Thus, the overall time used for conversion includes both the time required to move the film 110 into position before processing the film 110 and the time required for processing the film 110. Throughput is reduced drastically by the time required to move and station the film 110 at a certain position before the processing takes place and the time required to align the conversion system 114 (if necessary). Thus, the disclosure herein enables the elimination or reduction of the non-process times to improve the total throughput. Furthermore, the disclosure may reduce the mechanical and optical stress of optical films that could be induced by the ordinary process of step and repeat with dancers (weights located before and after the processing area) to hold the film flat over the process area. Further, in certain embodiments, the continuous flow of the material during laser processing induces optical anisotropy in the material, which may be advantageous. For example, in the case of polarizing film, the induced anisotropy substantially improves image quality.

FIGS. 2, 3, 4 and 5 are block diagrams of a system 200 for processing sheet material 210 according to certain embodiments. The system 200 includes a laser 212, a plurality of vacuum chucks 214 (twelve shown), and a translation stage or conveyor 216 configured to move the vacuum chucks 214 through a processing area of the laser 212. In one embodiment, the system 200 also includes X and Y stages (not shown) to move the laser beam 212 with respect to the sheet material 210. For example, the X and Y stages may include a gantry system. In addition, or in another embodiment, the system 200 may include a galvo (not shown) configured to further align a laser beam from the laser 212 with the sheet material 210.

As discussed above, the sheet material 210 may include, for example, plastic or optical film. In one embodiment, the sheet material 210 has a thickness between approximately 1 mm and approximately 2 mm. However, the embodiments disclosed herein are not limited to this range of thicknesses. Indeed, the system 200 may be configured to process materials having thicknesses substantially less than 1 mm and substantially greater than 2 mm. In certain embodiments, the system 200 processes the sheet material 210 as it is transferred from a first roll to a second roll. In other embodiments, the system 200 processes discrete pieces or sheets of the material 210.

Regardless of whether the sheet material 210 includes discrete sheets or is transferred from a first roll to a second roll, the vacuum chucks 214 are configured to securely hold the sheet material 210 while the conveyor 216 moves the vacuum chucks 214 and the sheet material 210 (as indicated by arrow 218) at a constant velocity. While the conveyor 216 and vacuum chucks 214 move the sheet material 210, the laser 212 delivers a laser beam (as indicated by arrow 220) to the sheet material 210 from the galvo block on the X and Y stages over the conveyor 216.

The laser beam positioning is coordinated through the galvo, the X and Y stages and the conveyor 216. Therefore, the overall processing time includes the beam delivery time without the additional time required for repeated alignment or the time required to repeatedly move material in and out of the processing area under the laser 212.

An artisan will understand from the disclosure herein that the galvo and/or the X and Y stages are not required in every embodiment. For example, in one embodiment, the system 200 includes the conveyor 216 for moving the sheet material 210 to be processed and the gantry of X and Y stages that move the laser beam incident to the work surface. Also, the system disclosed herein can support additional stages, such as one for Z direction to adjust the beam focus or the collimated beam size.

A compound beam positioner, according to one embodiment, provides slow and fast movements in order to process the sheet material 210 without ceasing beam movement. In one embodiment, the entire move may be composed of three or more different moves, namely slow, intermediate, and fast moves. However, the basic algorithm may remain the same as that of a conventional compound beam positioner. The gantry velocity may be maintained constant or may be monitored for adjustment of the beam positioning.

Figure 3:
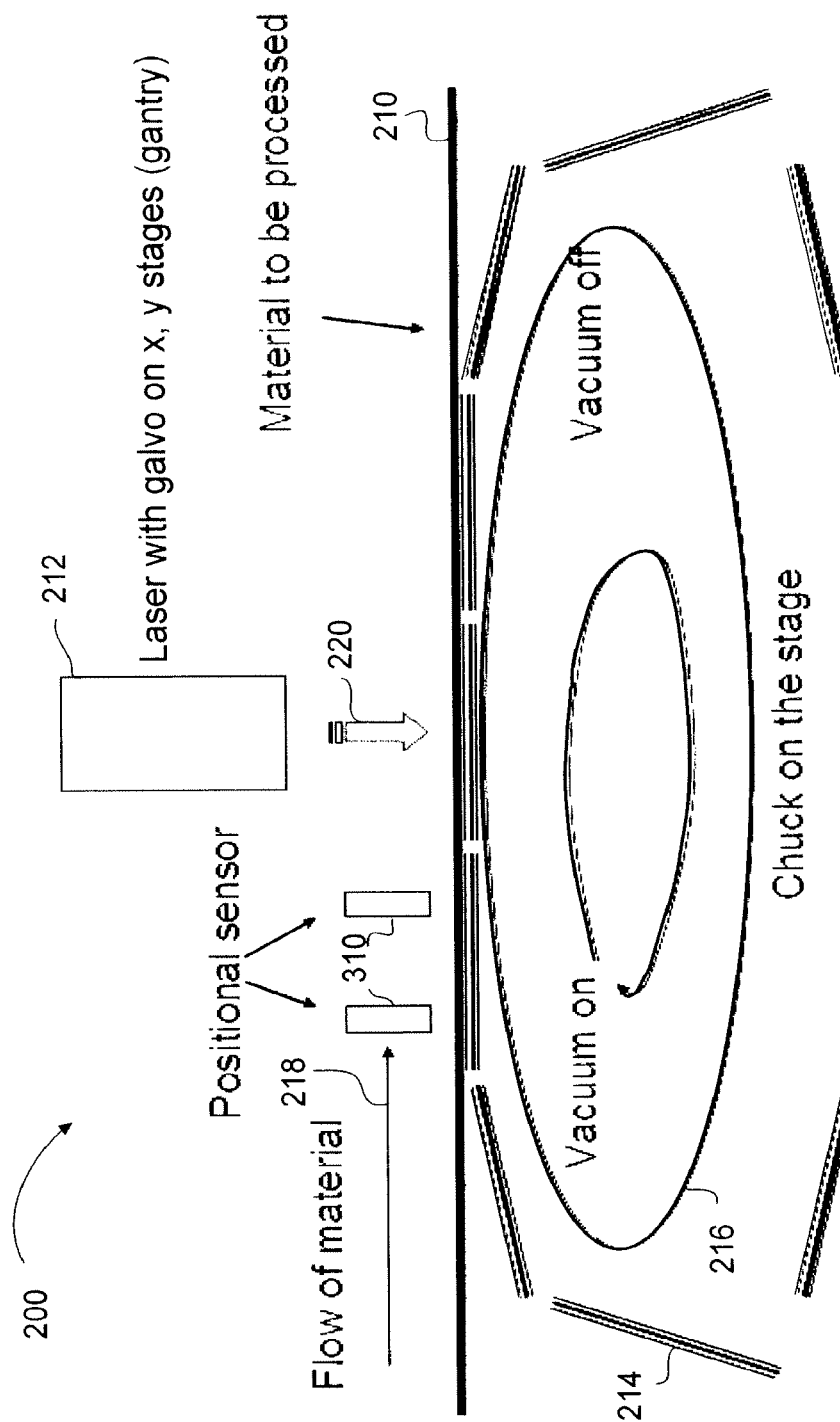
Figure 4:
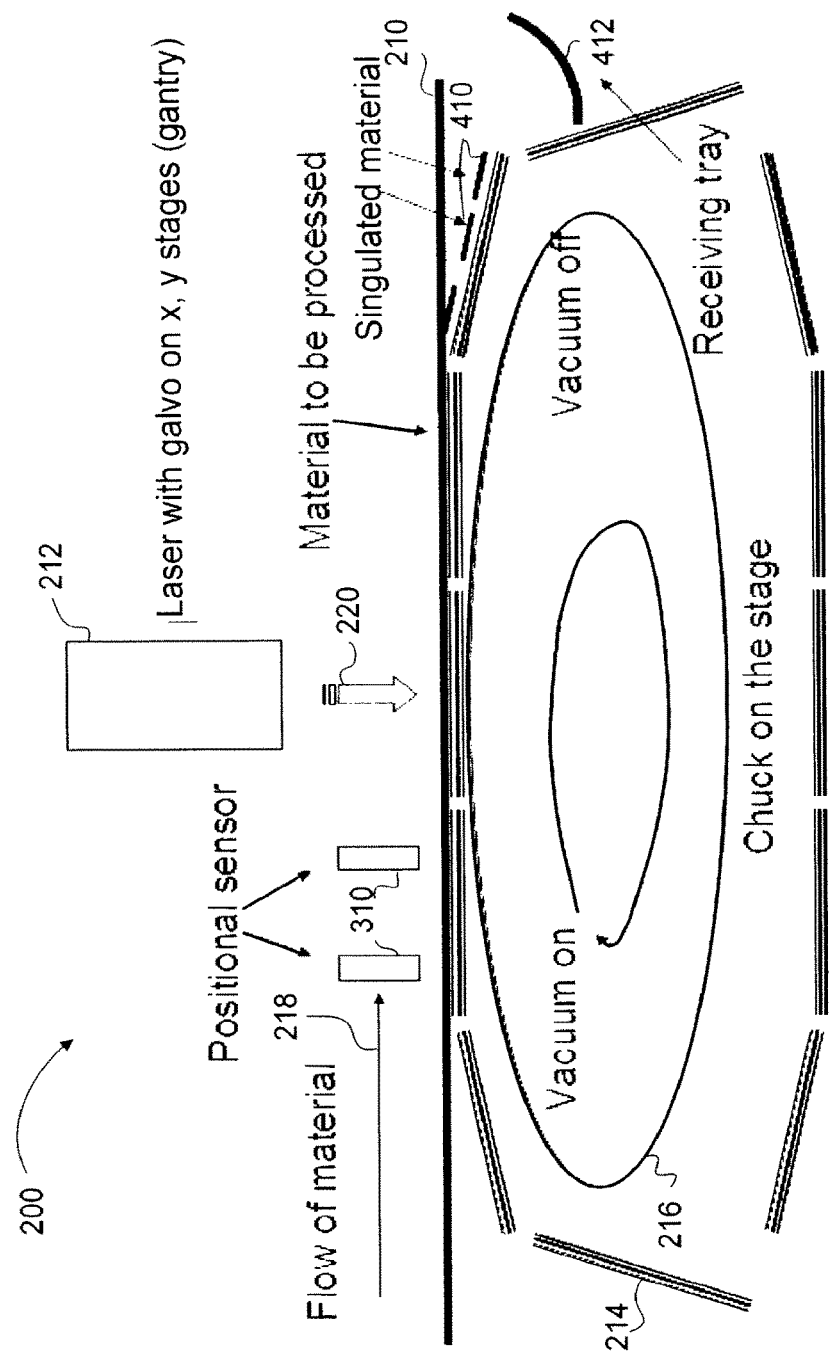

Rough alignment of the material to be processed may be done on a vacuum chuck 214 before the material is moved under the laser 212. For example, FIGS. 3 and 4 illustrate positional sensors 310 (two shown) located near a point along the conveyor 216 where the vacuum chucks 214 are aligned with the sheet material 210. In other embodiments, the sensors 310 may be installed on each vacuum chuck 214 or around the chucks 214. The sensors 310 may be, for example, a charge coupled device (CCD) or any other sensor to sense the position of the sheet material 210 with respect to the vacuum chucks 214. Such sensors 310 may be positioned in parallel in X and/or Y directions.

In some embodiments, small pieces of predetermined size are singulated out of the sheet material 210. In such embodiments, as shown in FIG. 4, singulated pieces 410 may be recovered from a vacuum chuck 214 by turning the vacuum off or by slightly applying a positive air pressure to expel the singulated pieces 410 off the chuck 214 to a nearby receiving tray 412. After expelling the singulated pieces 410, the vacuum chuck 214 may be carried by the conveyor 216 to a position where the vacuum is turned on for alignment with another portion of unprocessed sheet material 210. In another embodiment, if the process does not involve expelling the singulated pieces 410, the vacuum chucks 214 may be moved back and forth (e.g., without circulating around the conveyor 216), or may be moved in a combination of horizontal and vertical moves, to return the vacuum chucks 214 to the original alignment position where the vacuum is turned on.

To improve throughput, a dual head or multiple head system may also be considered. In such embodiments, the move of two heads in the Y direction, which is orthogonal to the flow of the material, may be in mirror image to reduce any vibration that may affect smooth beam movement with respect to the sheet material 210.

Figure 5:
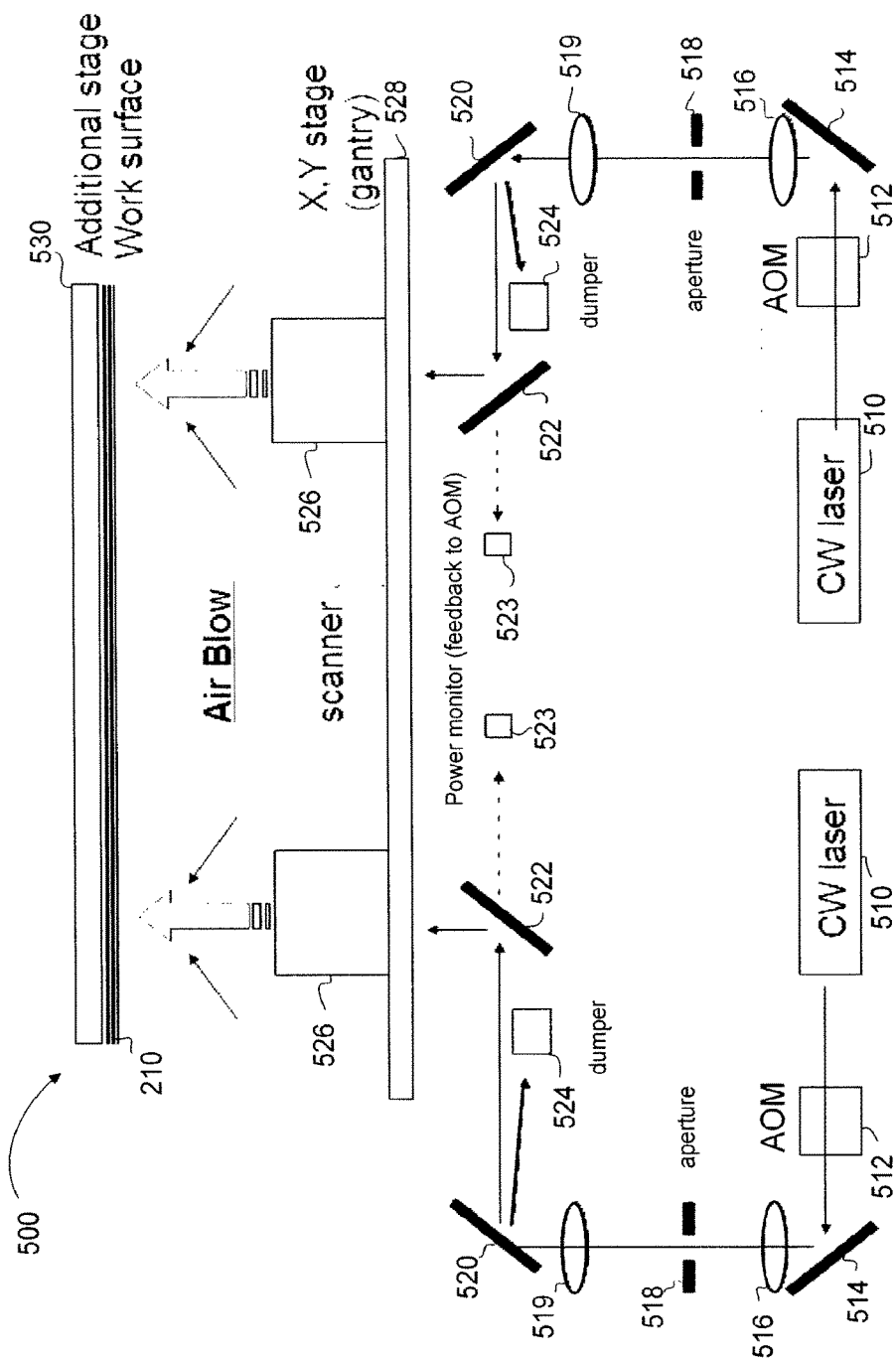

One example dual head system 500 is shown in FIG. 5. In this example embodiment, two laser paths each include a continuous wave (CW) laser 510 and an acousto-optic modulator (AOM) 512 configured as a sub-microsecond laser power controller/shutter. The AOM 512 is also configured as a pulser for the CW laser 510. In another embodiment, the AOM 512 may be configured as a pulse picker for a pulsed laser. The AOM 512 may also be configured for adjusting the pulse energy and repetition rate so that the processing can take place not only during the constant velocity periods, but also during the acceleration and deceleration periods.

Each laser path may include optics, such as a first mirror 514 for directing the laser beam from the AOM 512 through a first lens 516, an aperture 518, and a second lens 519 to a second mirror 520 configured to direct the laser beam to a beam splitter 522 or a beam dump 524, depending on a deflection angle selected by the AOM 512. In one embodiment, the beam splitter 522 directs a portion of the laser beam to a power monitor 523 configured to provide laser power control to the AOM 512. Each beam splitter 522 also directs a portion of the laser beam to a respective processing head 526 located on an X, Y stage (gantry) 528. Each processing head 526 directs its respective laser beam to the sheet material 210 aligned on an additional stage work surface 530.

B. Index Free Film Conversion System

Figure 6B:
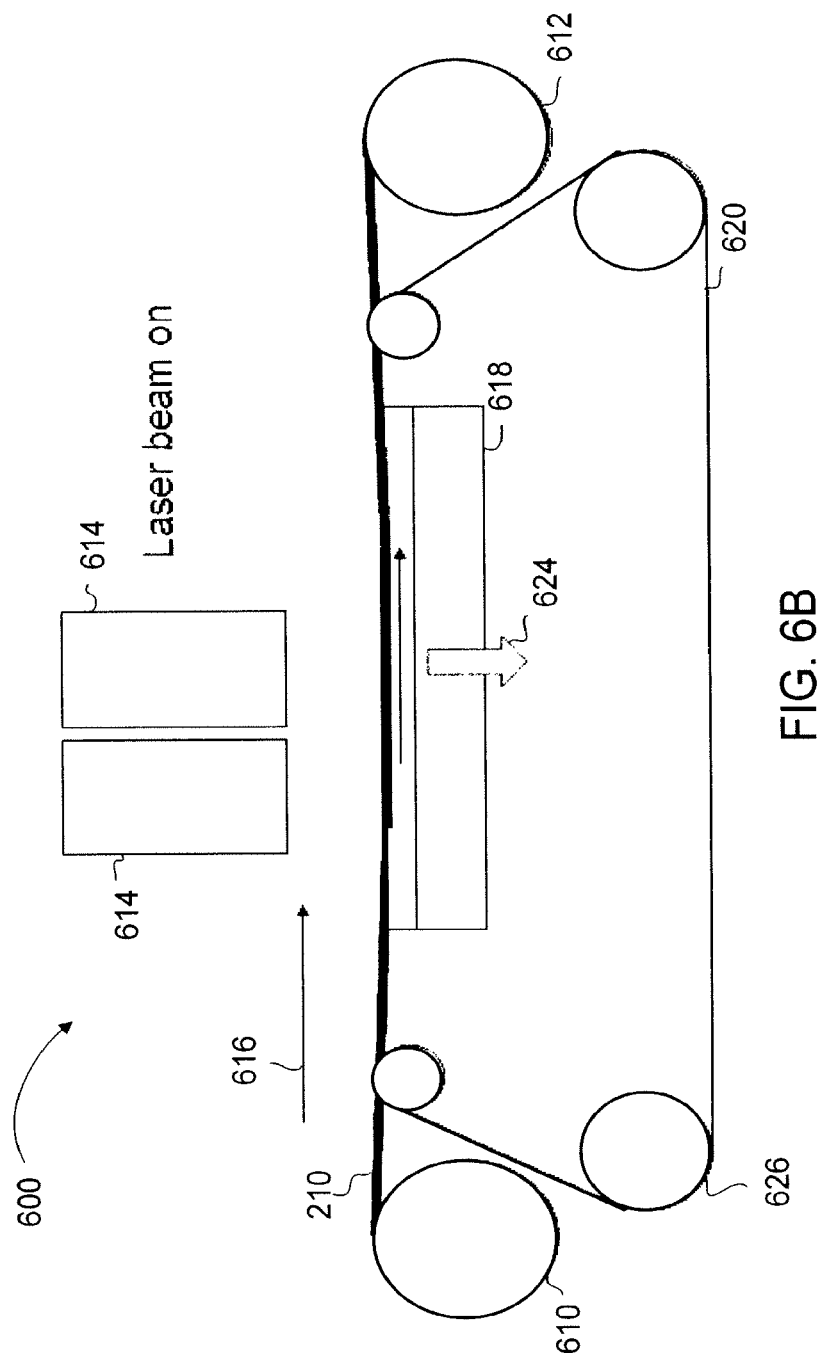

FIGS. 6A and 6B are block diagrams of a system 600 for processing sheet material according to another embodiment. This embodiment provides a method for accurately feeding sheet material 210 from a first roll 610 to a second roll 612 as the sheet material 210 is processed by one or more laser processing heads 614 (two shown). An artisan will understand from the disclosure herein that two or more processing heads 614 may be aligned in a direction that is parallel to a flow direction 616 of the sheet material 210 (as shown in FIGS. 6A and 6B) and/or in a direction that is perpendicular to the flow direction 616 of the sheet material 210.

The system 600 provides index free film conversion by coordinating the motion of the sheet material 210 as it travels from the first roll 610 to the second roll 612 with the motions of X and Y linear stages, a vacuum chuck 618, and X and Y galvanometers. In some embodiments, the system 600 also coordinates the motion of the sheet material 210 with a Z stage.

The system 600 also seemlessly provides for recovery of the converted pieces of sheet material 210. The system 600 includes a carrier 620 configured to receive converted pieces of the sheet material 210 and to transport the converted pieces to a location where they can be picked up (e.g., by a user or robotic device) for further processing (as indicated by arrow 622 in FIG. 6A). In one embodiment, the carrier 620 includes a metallic sheet positioned between the sheet material 210 and the vacuum chuck 618. An artisan will recognize from the disclosure herein that in other embodiments the carrier 620 may include non-metallic materials, such as plastic. In one embodiment, the carrier 620 forms a conveyor belt that, when the laser beam is off or blocked (FIG. 6A), travels between the sheet material 210 and the vacuum chuck 618.

In one embodiment, the sheet material 210 continually moves from the first roll 610 to the second roll 612 during the conversion process. To process the sheet material 210, the system 600 positions the processing heads 614 and the vacuum chuck 618 at respective initial positions. As shown in FIG. 6B, the vacuum chuck 628 turns on the vacuum (as shown by arrow 624) to temporarily affix the sheet material 210 and metallic sheet of the carrier 620 in place against the vacuum chuck 618. The metallic sheet is appropriately perforated so as to allow the vacuum chuck 618 to suck the sheet material 210 against the metallic sheet of the carrier 620. The underlying stage then moves the vacuum chuck 618 so as to feed the sheet material 210 at a known velocity and known position so that an accurate motion coordination becomes possible with the X and Y linear stages and the X and Y galvonometers of the processing heads 614.

While the vacuum chuck 618 moves the sheet material 210, the processing heads 614 turn on (or unblock) their respective laser beams to convert pieces of the sheet material 210. After the conversion process is complete for one set of conversion pattern, the laser beam is turned off (or blocked). The vacuum chuck 618 then turns off the vacuum so that the sheet material 210 and metallic sheet of the carrier 620 separate from the vacuum chuck 618. In one embodiment, to achieve a smooth detachment of the sheet material 210, the vacuum chuck 618 may blow air through the holes in metallic sheet of the carrier 620. After separation, the first roller 610 and/or second roller 612 continue to feed the sheet material 210 and the converted pieces remain on the carrier 620. The carrier 620 then transports the converted pieces of the sheet material 210 to a pick up location (see arrow 622 in FIG. 6A).

After the conversion is complete for one portion of the sheet material 210 being fed from the first roller 610 to the second roller 612, the vacuum chuck 618, the X and Y stages, and the X and Y galvanometers move back to their respective initial positions for realignment with an additional portion of the sheet material 210.

When the sheet material 210 is converted, debris or adhesive used between sheet layers may adversely stick to the surface of the metallic sheet of the carrier 620. As the system 600 continues to affix different portions of the sheet material 210 and carrier 620 to the vacuum chuck 618, the debris and adhesive may be transferred between the different portions of the sheet material 210. To avoid such contamination transfer according to one embodiment, the metallic sheet of the carrier 620 is cleaned before being aligned with each portion of the sheet material 210.

In certain embodiments, the first roller 610 and/or the second roller 612 do not provide accurate velocity control of the sheet material 210. Rather, the vacuum chuck 618 with the underlying linear stage provides an accurate reference of the velocity and position during conversion. However, to avoid an adversely large difference in the velocity provided by the rollers 610, 612 and the velocity provided by the vacuum chuck 618, the system 600 may include a velocity controller and feedback sensors to control the relative velocities. Thus, each portion of the sheet material 210 may be quickly aligned with the vacuum chuck 618. The velocity control also allows the sheet material 210 to be fed from the first roller 610 to the second roller 612 at a substantially constant velocity throughout the conversion process of an entire continuous sheet or roll of material.

In some embodiments, the vacuum chuck 618 provides the only movement of the metallic sheet of the carrier 620. In other embodiments, the metallic sheet of the carrier 620 is driven by other rollers 626 (four shown) when not affixed to the vacuum chuck 618. In certain such embodiments, the system 600 includes appropriate velocity control and feedback to reduce the difference between the velocity of the metallic sheet of the carrier 620 and the velocity of the vacuum chuck 618.

It will be obvious to those having skill in the art that many changes may be made to the details of the above-described embodiments without departing from the underlying principles of the invention. The scope of the present invention should, therefore, be determined only by the following claims.

The invention claimed is:

1. A method for processing sheet material with a laser beam from a laser processing head, the method comprising:
driving at least one of a first roller and a second roller to continuously move the sheet material in a first direction from the first roller to the second roller at a first velocity;
at an initial position, removably affixing a moving vacuum chuck to a first portion of the sheet material as the first portion of the sheet material continuously moves from the first roller to the second roller;
removably affixing a carrier between the moving vacuum chuck and the removably affixed first portion of the sheet material;
moving the moving vacuum chuck, with the first portion of the sheet material affixed thereto through suction holes formed in the carrier, so that during processing with the laser beam the first portion of the sheet material and the carrier are continuously moved from the initial position in the first direction through a laser processing area by the moving vacuum chuck from the first roller to the second roller at a second velocity, wherein the moving vacuum chuck is independently moveable with respect to the carrier and wherein when the laser beam is off or blocked the carrier is configured to travel between the moving sheet material and the moving vacuum chuck;
providing feedback of the first velocity provided by the first and second rollers relative to the second velocity provided by the moving vacuum chuck;
coordinating, based at least in part on the feedback, relative motions of the vacuum chuck, the first and second rollers, and the laser beam;
laser processing the sheet material by illuminating the first portion of the sheet material with the laser beam while the first portion of the sheet material is affixed to the vacuum chuck;
after the first portion is processed by the laser beam, detaching the carrier and the first portion of the sheet material from the moving vacuum chuck; and
removably affixing the moving vacuum chuck to a second portion of the sheet material without stopping the sheet material from moving from the first roller to the second roller.

2. A method for processing sheet material with a laser beam from a laser processing head, the method comprising:
driving at least one of a first roller and a second roller to continuously move the sheet material in a first direction from the first roller to the second roller at a first velocity;
at an initial position, removably affixing a moving vacuum chuck to a first portion of the sheet material as the first portion of the sheet material continuously moves from the first roller to the second roller;
removably affixing a carrier between the moving vacuum chuck and the removably affixed first portion of the sheet material;
moving the moving vacuum chuck, with the first portion of the sheet material affixed thereto through suction holes formed in the carrier, so that during processing with the laser beam the first portion of the sheet material and the carrier are continuously moved from the initial position in the first direction through a laser processing area by the moving vacuum chuck from the first roller to the second roller at a second velocity, wherein the moving vacuum chuck is independently moveable with respect to the carrier and wherein when the laser beam is off or blocked the carrier is configured to travel between the moving sheet material and the moving vacuum chuck;
providing feedback of the first velocity provided by the first and second rollers relative to the second velocity provided by the moving vacuum chuck;
coordinating, based at least in part on the feedback, relative motions of the vacuum chuck, the first and second rollers, and the laser beam;
laser processing the sheet material by illuminating the first portion of the sheet material with the laser beam while the first portion of the sheet material is affixed to the vacuum chuck;
after the first portion is processed by the laser beam, detaching the carrier and the first portion of the sheet material from the moving vacuum chuck;
moving two or more additional moving vacuum chucks; and
removably affixing the two or more additional moving vacuum chucks to two or more second portions of the sheet material for laser processing as the sheet material moves from the first roller to the second roller.

3. A method for processing sheet material with a laser beam from a laser processing head, the method comprising:
driving at least one of a first roller and a second roller to continuously move the sheet material in a first direction from the first roller to the second roller at a first velocity;
at an initial position, removably affixing a moving vacuum chuck to a first portion of the sheet material as the first portion of the sheet material continuously moves from the first roller to the second roller;
removably affixing a carrier between the moving vacuum chuck and the removably affixed first portion of the sheet material;
moving the moving vacuum chuck, with the first portion of the sheet material affixed thereto through suction holes formed in the carrier, so that during processing with the laser beam the first portion of the sheet material and the carrier are continuously moved from the initial position in the first direction through a laser processing area by the moving vacuum chuck from the first roller to the second roller at a second velocity, wherein the moving vacuum chuck is independently moveable with respect to the carrier and wherein when the laser beam is off or blocked the carrier is configured to travel between the moving sheet material and the moving vacuum chuck;
providing feedback of the first velocity provided by the first and second rollers relative to the second velocity provided by the moving vacuum chuck;
coordinating, based at least in part on the feedback, relative motions of the vacuum chuck, the first and second rollers, and the laser beam;
laser processing the sheet material by illuminating the first portion of the sheet material with the laser beam while the first portion of the sheet material is affixed to the vacuum chuck;
after the first portion is processed by the laser beam, detaching the carrier and the first portion of the sheet material from the moving vacuum chuck; and
moving the laser processing head with respect to the moving sheet material, wherein coordinating the relative motions comprises coordinating relative motions of the vacuum chuck, the first and second rollers, and the laser processing head.

4. The method of claim 3, wherein moving the laser processing head comprises operating at least two linear stages to move the processing head parallel to and perpendicular to the first direction.

5. The method of claim 4, wherein coordinating the relative motions further comprises operating at least two galvanometers to steer the laser beam parallel to and perpendicular to the first direction.

6. A method for processing sheet material with a laser beam from a laser processing head, the method comprising:
driving at least one of a first roller and a second roller to continuously move the sheet material in a first direction from the first roller to the second roller at a first velocity;
at an initial position, removably affixing a moving vacuum chuck to a first portion of the sheet material as the first portion of the sheet material continuously moves from the first roller to the second roller;
removably affixing a carrier between the moving vacuum chuck and the removably affixed first portion of the sheet material;
moving the moving vacuum chuck, with the first portion of the sheet material affixed thereto through suction holes formed in the carrier, so that during processing with the laser beam the first portion of the sheet material and the carrier are continuously moved from the initial position in the first direction through a laser processing area by the moving vacuum chuck from the first roller to the second roller at a second velocity, wherein the moving vacuum chuck is independently moveable with respect to the carrier and wherein when the laser beam is off or blocked the carrier is configured to travel between the moving sheet material and the moving vacuum chuck;
providing feedback of the first velocity provided by the first and second rollers relative to the second velocity provided by the moving vacuum chuck;
coordinating, based at least in part on the feedback, relative motions of the vacuum chuck, the first and second rollers, and the laser beam;
laser processing the sheet material by illuminating the first portion of the sheet material with the laser beam while the first portion of the sheet material is affixed to the vacuum chuck; and
after the first portion is processed by the laser beam, detaching the carrier and the first portion of the sheet material from the moving vacuum chuck,
wherein moving the moving vacuum chuck comprises operating a motion stage to move the moving vacuum chuck in at least the first direction and a second direction, and wherein the second direction is opposite the first direction.

7. A method for processing sheet material with a laser beam from a laser processing head, the method comprising:
driving at least one of a first roller and a second roller to continuously move the sheet material from the first roller to the second roller at a first velocity;
removably affixing a first vacuum chuck to a first portion of the sheet material as the first portion of the sheet material continuously moves from the first roller to the second roller;
removably affixing a carrier between the first vacuum chuck and the removably affixed first portion of the sheet material;
moving the first vacuum chuck, with the first portion of the sheet material affixed thereto through suction holes formed in the carrier, so that during processing with the laser beam the entire moving sheet and the carrier are continuously moved through a laser processing area by the first vacuum chuck from the first roller to the second roller at a second velocity, wherein the first vacuum chuck is provided independently from the carrier and is independently movable, and wherein when the laser beam is off or blocked the carrier is configured to travel between the moving sheet material and the first vacuum chuck;
providing feedback of the first velocity provided by the first and second rollers relative to the second velocity provided by the first vacuum chuck;
coordinating, based at least in part on the feedback, relative motions of the first vacuum chuck, the first and second rollers, and the laser beam;
laser processing the sheet material by illuminating the first portion of the sheet material with the laser beam while the first portion of the sheet material is affixed to the first vacuum chuck;
releasing the first portion of the sheet material from the first vacuum chuck after the first portion of the sheet material is processed by the laser beam;
moving two or more second vacuum chucks; and
removably affixing the two or more second vacuum chucks to two or more second portions of the sheet material for laser processing as the sheet material moves from the first roller to the second roller.

8. The method of claim 7, further comprising removably affixing the first vacuum chuck to a third portion of the sheet material without stopping the sheet material from moving from the first roller to the second roller.

9. The method of claim 7, further comprising moving the first vacuum chuck and the two or more second vacuum chucks at the second velocity.

10. The method of claim 7, further comprising moving a laser processing head with respect to the moving sheet material, wherein coordinating the relative motions comprises coordinating relative motions of the first vacuum chuck, the first and second rollers, and the laser processing head.

11. The method of claim 10, wherein moving the laser processing head comprises operating two linear stages to move the processing head in two perpendicular directions.

12. The method of claim 11, wherein coordinating the relative motions further comprises operating two galvanometers to steer the laser beam in the two perpendicular directions.

13. A method for processing sheet material with a laser beam from a laser processing head, the method comprising:
driving at least one of a first roller and a second roller to continuously move the sheet material in a first direction from the first roller to the second roller at a first velocity;
at an initial position, removably affixing a moving vacuum chuck on a motion stage to a first portion of the sheet material as the first portion of the sheet material continuously moves from the first roller to the second roller;
removably affixing a carrier between the moving vacuum chuck and the removably affixed first portion of the sheet material;
moving the motion stage, with the first portion of the sheet material affixed to the moving vacuum chuck through suction holes formed in the carrier, so that during processing with the laser beam the first portion of the sheet material and the carrier are continuously moved from the initial position in the first direction through a laser processing area by the moving vacuum chuck on the moving motion stage, wherein the moving vacuum chuck is independently movable with respect to the carrier and is independently movable by the motion stage, and wherein when the laser beam is off or blocked the carrier is configured to travel between the moving sheet material and the moving vacuum chuck;

providing feedback of the first velocity provided by the first and second rollers relative to the second velocity provided by the moving vacuum chuck;

coordinating, based at least in part on the feedback, relative motions of the moving vacuum chuck on the motion stage, the first and second rollers, and the laser beam;

laser processing the sheet material by illuminating the first portion of the sheet material with the laser beam while the first portion of the sheet material is affixed to the moving vacuum chuck;

releasing the first portion of the sheet material from the moving vacuum chuck after the first portion of the sheet material is processed by the laser beam; and removably affixing the moving vacuum chuck to a second portion of the sheet material without stopping the sheet material from moving from the first roller to the second roller.

14. A method for processing sheet material with a laser beam from a laser processing head, the method comprising:

driving at least one of a first roller and a second roller to continuously move the sheet material in a first direction from the first roller to the second roller at a first velocity;

at an initial position, removably affixing a moving vacuum chuck on a motion stage to a first portion of the sheet material as the first portion of the sheet material continuously moves from the first roller to the second roller;

removably affixing a carrier between the moving vacuum chuck and the removably affixed first portion of the sheet material;

moving the motion stage, with the first portion of the sheet material affixed to the moving vacuum chuck through suction holes formed in the carrier, so that during processing with the laser beam the first portion of the sheet material and the carrier are continuously moved from the initial position in the first direction through a laser processing area by the moving vacuum chuck on the moving motion stage, wherein the moving vacuum chuck is independently movable with respect to the carrier and is independently movable by the motion stage, and wherein when the laser beam is off or blocked the carrier is configured to travel between the moving sheet material and the moving vacuum chuck;

providing feedback of the first velocity provided by the first and second rollers relative to the second velocity provided by the moving vacuum chuck;

coordinating, based at least in part on the feedback, relative motions of the moving vacuum chuck on the motion stage, the first and second rollers, and the laser beam; and laser processing the sheet material by illuminating the first portion of the sheet material with the laser beam while the first portion of the sheet material is affixed to the moving vacuum chuck, wherein moving the moving vacuum chuck comprises operating the motion stage in at least the first direction and a second direction, and wherein the second direction is opposite to the first direction.

* * * * *